（12) United States Patent
Dix et al.

(10) Patent No.: US 8,145,390 B2
(45) Date of Patent: Mar. 27, 2012

(54) SWATH FINDER FEATURE INTEGRATED WITH MULTIPURPOSE DISPLAY

(75) Inventors: Peter J. Dix, Naperville, IL (US); William Kyle Dooley, Burr Ridge, IL (US); Kousha Moaveni-Nejad, Chicago, IL (US)

(73) Assignee: CNH America LLC, New Holland, PA (US)

( * ) Notice: Subject to any disclaimer, the term of this patent is extended or adjusted under 35 U.S.C. 154(b) by 969 days.

(21) Appl. No.: 11/740,408

(22) Filed: Apr. 26, 2007

(65) Prior Publication Data

US 2008/0269956 A1  Oct. 30, 2008

(51) Int. Cl.
*G06F 19/00* (2011.01)
*G01C 21/00* (2006.01)
*A01D 41/127* (2006.01)

(52) U.S. Cl. ......... 701/50; 701/466; 701/538; 56/10.2 R

(58) Field of Classification Search ............... 701/1, 23, 701/25, 36, 41, 50, 200, 205, 206, 207, 213, 701/300, 400, 408, 466, 538; 56/1, 10.2 R; 172/5, 233, 278–280, 430
See application file for complete search history.

(56) References Cited

U.S. PATENT DOCUMENTS

| 4,129,087 | A | 12/1978 | Dimmick et al. |
| 5,945,917 | A | 8/1999 | Harry |
| 5,995,902 | A | 11/1999 | Monson |
| 6,128,574 | A | 10/2000 | Diekhans |
| 6,363,321 | B1 | 3/2002 | Fowler et al. |
| 6,463,374 | B1 | 10/2002 | Keller et al. |
| 6,553,311 | B2 | 4/2003 | Aheam et al. |
| 6,567,747 | B1 | 5/2003 | Lange et al. |
| 6,711,501 | B2 | 3/2004 | McClure et al. |
| 6,816,761 | B2 | 11/2004 | Denton |
| 7,054,731 | B1 | 5/2006 | Lange et al. |
| 2004/0124605 | A1 | 7/2004 | McClure et al. |
| 2005/0171693 | A1 | 8/2005 | Lange et al. |
| 2006/0069485 | A1 | 3/2006 | Diekhans |
| 2006/0178825 | A1 | 8/2006 | Eglington et al. |

*Primary Examiner* — Jack W Keith
*Assistant Examiner* — Edward Pipala
(74) *Attorney, Agent, or Firm* — Patrick M. Sheldrake

(57) ABSTRACT

A GPS-based vehicle guidance system method for providing an integrated display for the operator of a vehicle and provides determining the ideal swath path based on predetermined and user inputted parameters. The method is applied to both manual and automatic modes of operation, and includes the use of an integrated display that clearly indicates whether the system is operating in chase or pull mode of operation with continuous indicators. The method also includes providing guidance to the vehicle operator at the beginning of the process and during end of row turns, to enable the vehicle to align with the predetermined swath paths.

24 Claims, 6 Drawing Sheets

SWATH FINDER FEATURE INTEGRATED WITH MULTIPURPOSE DISPLAY

BACKGROUND OF THE INVENTION

The present invention relates generally to GPS-based vehicle guidance systems and more particularly to a method for providing an ideal swath path based on predetermined and user-inputted parameters and for providing an integrated display for the operator of a vehicle. The method provides vehicle position information, and more specifically, the method indicates to a user the actual location of the vehicle in relation to the calculated swath path, regardless of the mode of operation.

Tractors and other off-road work vehicles in the agricultural, mining and construction industries have typically operated with manual steering by the operator. Recent changes in control systems and the development of satellite-based navigation (GPS) systems, including those incorporating differential correction systems, have allowed tractors or other vehicles to operate in semi-automatic or fully automatic steering modes. Combining satellite navigation and ground-based navigation input signals precisely identifying vehicle position and speed with sophisticated on-board vehicle electronic control systems allow the tractor or other vehicle to steer itself with a high degree of accuracy when traversing terrain. The result is that precision farming practices are transitioning from a luxury to a necessity, capable of improving efficiency and yield in common farming operations, such as tilling, seeding, fertilizing, spraying and harvesting.

To provide this control, the prior art teaches using satellite-positioning information by an on-board vehicle navigation control system to accurately determine and control a vehicle's position while operating in a field. The operator will typically enter the planned route of the tractor or vehicle, or let the control system determine the most efficient route. The control methods are well known in the art, and may involve multiple position transmitters or receivers, with various signals used to derive vehicle location, elevation, direction of travel (vehicle heading), attitude and speed.

The task of precision guidance of an agricultural vehicle involves not only accurately determining vehicle position in a field, but also defining an efficient array of paths to be followed by the vehicle that will, in conjunction with the swath of an associated implement, create an overall swath pattern that efficiently and effectively covers the crop area of a field or work area. The pattern must be located and oriented on the field or work area, and the physical characteristics and limitations of the vehicle and coupled implement must be identified and provided to the navigation system. Implement or header width, location of the implement or header with respect to the vehicle, and limitations on vehicle and associated implement movement, such as minimum turning radius, must also be considered. With this information it is possible to define a series of swath paths for the vehicle to travel in an attempt to cover all cultivatable portions of a field without unnecessary gaps or overlaps.

Calculating the series of paths needed to cover an area without substantial gaps or overlaps is relatively straightforward when straight paths can be used; however, not all fields can be covered in this manner. Many fields require the use of paths having a curvature that varies along at least some portion of its length, whether to follow irregularly shaped boundaries, avoid obstacles within the field, follow topographic contours of the ground, implement agronomic farming practices, or to contour the ground for irrigation. Such conditions preclude a complete reliance on geometrically predefined paths, such as straight lines or constant radius curves. In order to provide generally equally spaced swaths, the path of each adjacent swath must change slightly compared to the prior swath path as the vehicle moves generally transversely across the field (i.e., from one swath to the next) because the radius of each curved portion of the swath path varies slightly from the adjacent swath path.

Vehicle guidance systems must be able to store and retrieve swath path information as well as determine new adjacent swath paths from a baseline swath path or create new swath paths from defined starting and ending positions. The number of swath paths to be stored and/or determined increases as the size of the field increases. For swath paths that include variable curvature along their length, the number of positional data points necessary to fully define the swath path between starting and ending points is significantly increased compared to using only starting and ending position points to create straight-line paths. The systems must also quickly present swath path and control information to the operator in an easily understood and useful manner, which requires computational efficiency. As the vehicle operator positions the vehicle near the start of a swath path and prepares to engage the vehicle navigation system, the system must quickly determine if a swath path has been stored in system memory or can be calculated from a swath path stored in system memory and then direct the vehicle to the closest, presumably most appropriate path. If no swath paths are stored in the system memory, then the system must alert the operator and direct the recording of a new swath path or allow the operator to provide a stored swath path from another memory source (i.e., change the removable memory media to one having stored swath path information).

Satellite-based vehicle guidance systems may periodically experience signal drift. Vehicle position signal drift introduces differences between the actual vehicle position and the vehicle position sensed by the vehicle guidance system. In precision farming applications, even slight discrepancies can have significant impact on the swath pattern in a field. As a result, vehicle guidance systems must be able to compensate for signal drift, adjusting the vehicle position sensed by the guidance system to match actual vehicle and implement position in the field.

It would be a great advantage to provide a method for more clearly indicating to the operator what direction to steer to stay on the ideal swath path. It would also be a great advantage to include a method for determining this direction indication based on an ideal stored path, the positions of the vehicle, operator selectable parameters and other vehicle parameters. It would be even more of an advantage to provide these features for both automatic and manual operation of a vehicle. In addition, it would be an advantage to provide guidance to the operator of the vehicle when making end of row turns and when properly lining up the vehicle prior to engaging automatic operation and beginning a new swath path. It would also be an advantage to provide an integrated display that includes features such as speed monitors, fault indicators, work progress tracking, implement control and a guidance indicator. These and other advantages are provided by the method and vehicle guidance system described below.

SUMMARY OF THE INVENTION

One embodiment of the present invention includes a method for a vehicle guidance system including the steps of providing a vehicle with an associated implement, a vehicle guidance system and a swath path generation apparatus (SGA) having a processing capability and an SGA memory device, and communicatively coupled to the guidance system. The method also includes providing an operator input device and communicating a set of predetermined parameters to the SGA. Further, the method includes providing at least one calculated swath path adjacent and generally parallel to a baseline swath path, monitoring the vehicle's actual path and comparing the vehicle's actual path to the at least calculated swath path. The method calculates by an iterative process a corrected swath path based on the set of predetermined parameters stored in the SGA memory device, the vehicle's actual swath path and the calculated swath path to maintain the vehicle's operation along the calculated swath path. Lastly, the method involves providing a display unit configured to display information from the corrected swath path.

Another embodiment of the present invention includes A method for a vehicle guidance system including the steps of providing a vehicle with an associated implement, operating the vehicle in a manual mode of operation, providing a vehicle guidance system having a vehicle position receiver and providing a swath path generation apparatus (SGA) having a processing capability and an SGA memory device, and being communicatively coupled to the guidance system. The method also includes providing an operator input device and communicating a set of predetermined parameters to the SGA. Further, at least one calculated swath path generally parallel to a baseline swath path is provided, and the vehicle's actual path is monitored. The method also includes comparing the vehicle's actual path to the calculated swath path and calculating, based on an iterative process, a corrected path based on the set of predetermined parameters stored in the SGA memory device, the vehicle's actual swath path and the calculated swath path to maintain the vehicle's operation along the calculated swath path. A display unit configured to display information from the corrected path is provided as well.

Yet another embodiment of the present invention includes a system for a vehicle guidance system having a vehicle and an associated implement, a vehicle guidance system configured to monitor an actual swath path and an operator input device. The system also includes a display unit configured to display a baseline swath path, the actual swath path and at least one calculated swath path. The system has a swath path generation apparatus (SGA) having a processing capability and a memory device with the capability to calculate, by applying a first algorithm, at least one calculated swath path arranged generally parallel to the baseline swath path and being configured to calculate a corrected swath path by applying a second algorithm, the corrected swath path based on the set of predetermined parameters stored in the SGA memory device, the actual swath path of the vehicle and the calculated swath path. The vehicle guidance system correlates the corrected swath path with the actual swath path to maintain the actual path of the vehicle in alignment with the calculated swath path.

One advantage of the present invention includes eliminating the typical LED light bar guidance indicator and integrating it on an LCD display with other feature indicators.

Another advantage of the present invention is to provide clear directional guidance showing the operator whether the system is in the chase or pull mode.

Yet another advantage of the present invention is to provide a steering guidance indicator that notifies the operator of the distance the vehicle has deviated from the ideal path.

Still another advantage of the present invention is that the guidance system and integrated display may be used with both automatic and manual modes of operation.

Yet another advantage of the present invention is that an indication is given on what direction the vehicle will turn and how far the vehicle will steer.

Another advantage of the present invention is that assistance is provided to the operator in properly lining up the vehicle to the next swath path after an end of row turn before engaging in an automatic mode of operation.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Any reference herein to the terms "left" or "right," "up" or "down," or "top" or "bottom" are used as a matter of mere convenience, and are determined by standing at the rear of the vehicle facing in its normal, or forward, direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

The swath generation methodologies described herein may find application in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. Although the various methods will be described with particular reference to GPS satellite-based systems, it should be appreciated that the teachings are equally applicable to guidance systems using other methods to determine vehicle position.

Figure 1:
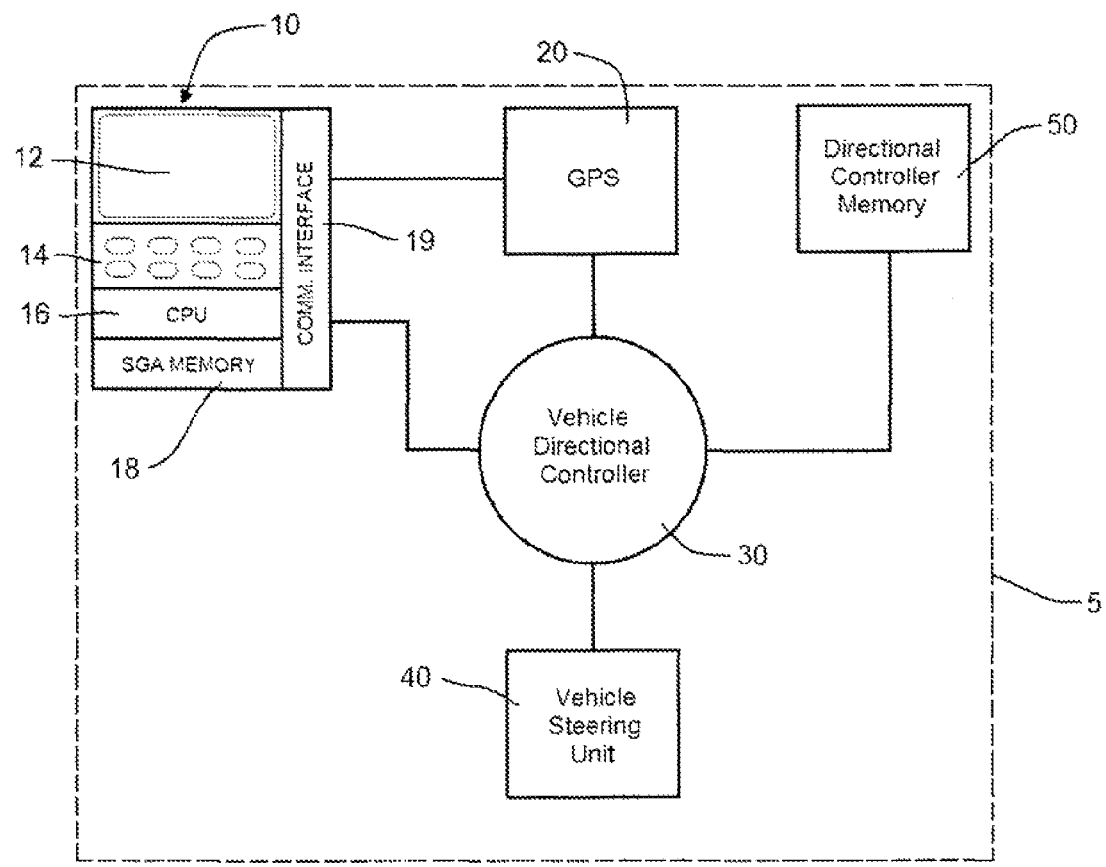
FIG. 1 illustrates a schematic diagram for a typical GPS-based vehicle guidance system used for the present invention.

An automatic GPS-based vehicle guidance system 5, seen schematically in FIG. 1, is of the type commonly used in agricultural and construction operations and is located on an agricultural tractor or similar prime mover to simplify the task of driving the vehicle. The vehicle guidance system 5 is located on a tractor and includes a directional controller 30, a global positioning system receiver (GPS) 20, a swath generation apparatus (SGA) 10, and a steering unit 40 communicatively coupled in a manner that enables each to send and receive data and/or control signals. It should be understood that a tractor is used in this specification for exemplary and simplicity purposes only and any type of suitable vehicle may be used with the present invention. The steering unit 40 preferably includes proportional or directional control valves that are hydraulically connected to a steering actuator for the tractor. The vehicle guidance system 5 continually calculates a vehicle steering heading by comparing vehicle position and directional heading to a desired travel path provided by the SGA 10, and sends the vehicle steering heading to the steering unit 40, which in turn actuates vehicle steering thereby changing the vehicle heading. The vehicle navigation system 5 may further include other sensors, such as vehicle yaw and roll, implement hitch angle, and the like, which would also be communicatively coupled to the vehicle guidance system 5 and adjust the vehicle position signal to compensate for such vehicle movements. Though shown as discreet devices, the functions of the vehicle directional controller 30, swath generation apparatus 10, and other portions of the vehicle guidance system can easily be integrated into a single apparatus within the intent of this invention.

The directional controller 30 is typically a microprocessor-based apparatus that receives near real-time position information from the GPS 20, compares the then-current vehicle position with the intended position along a swath path (provided by the SGA 10), and directs an output signal to the vehicle steering unit 40 to cause the vehicle to be steered toward the intended position. The vehicle guidance system 5 shown is representative of numerous GPS-based vehicle guidance systems in which an SGA 10 incorporating the present invention may prove useful.

The SGA 10 is preferably mounted inside the operator compartment of the tractor to be easily accessible to the operator. The SGA 10 preferably includes a visual display 12 and an operator input device 14 to enable the operator to interface with the vehicle guidance system 5, and a microprocessor (CPU) 16, an SGA memory 18, and a communication interface 19 that allows the SGA 10 to communicate with other components of the vehicle guidance system 5. The operator input device 14, of which examples include keyboards, touchpads, joysticks, and the like, may be integrated into the visual display 12 (e.g., a touch-screen) so that task-specific "keys" can be easily provided in a compact format or modified by software changes. The SGA memory 18 preferably comprises a removable memory media for all or a portion of the total SGA memory that allows stored swath path information to be conveniently moved and shared among multiple vehicles or with other computer system (i.e., an office computer system). When removable media is utilized, the SGA memory 18 may function as yet another variation of the operator input device 14. The SGA 10 provides computational capability thereby allowing the directional controller 30 to be dedicated to the task of guiding the vehicle along a desired swath path determined by the SGA 10. The primary tasks of the SGA 10 are: to memorize a baseline swath path; efficiently store the position data for points along the baseline swath path; generate additional, generally parallel swath paths that, in the aggregate, define a swath pattern that covers the crop growing area of a field; and efficiently communicate the swath path information, as needed, to the directional controller 30. The SGA 10 is also tasked with accepting operator inputs that may require changes to a baseline swath path and efficiently recreating a revised baseline swath path from which updated or new swath paths may be created. These changes may be in the form of a "nudge" that alters the swath path to compensate for variations in the vehicle position signal or a lateral shift of the swath path needed to adjust the swath path for implements of differing widths.

The SGA 10 is configured to receive information about the field to be processed from the operator and to selectively transmit the swath path definition information to the directional controller 30. Input information may include field information (e.g., name, location, size, and boundary locations), the operations to be performed, the implements to be used while processing the field, and the geometry of each implement. Input information may be manually input via the operator input device 14, but is more conveniently transferred into the SGA using a removable module for the SGA memory (e.g., a portable memory card) so that the operator can select from stored information. Information can be entered into portable memory cards by numerous means, including computers, which offer greater ease and efficiency for such operations compared to performing them while seated in the vehicle ready to commencing farming operations. An alternate embodiment uses common wireless technology to transmit general input information and a baseline swath path definition to the SGA further enhancing the SGA's ability to share stored swath path information.

With basic information about a field entered, including a baseline swath, the operator may select a desired swath path and swath pattern type from those available in SGA memory 18. Alternatively, the operator may choose to define and store a new swath path and/or swath pattern in the SGA memory. Once a baseline swath is identified or selected, the SGA 10, in accordance with its internal programming, will create a swath pattern comprising a series of additional swath paths that will, as a whole, define a series of swath paths that, based on specific vehicle and implement characteristics, cover substantially all of the crop growing area of a selected field. In the preferred embodiment of the present invention, not all swath paths are created and retained in SGA memory. The method used in the present invention creates a limited number of the total number of swath paths needed and then, based on movement of the vehicle in the field, calculates additional swath paths when needed. As the vehicle is positioned near an end of a swath and the vehicle guidance system is engaged, information defining the desired swath path is communicated by SGA 10 for use by the directional controller 30 to manage vehicle movement along the desired path. The rate of communication of swath path information may be varied so that SGA 10 provides swath path position data points at an optimal rate for the directional controller used in the vehicle guidance system.

Figure 2:
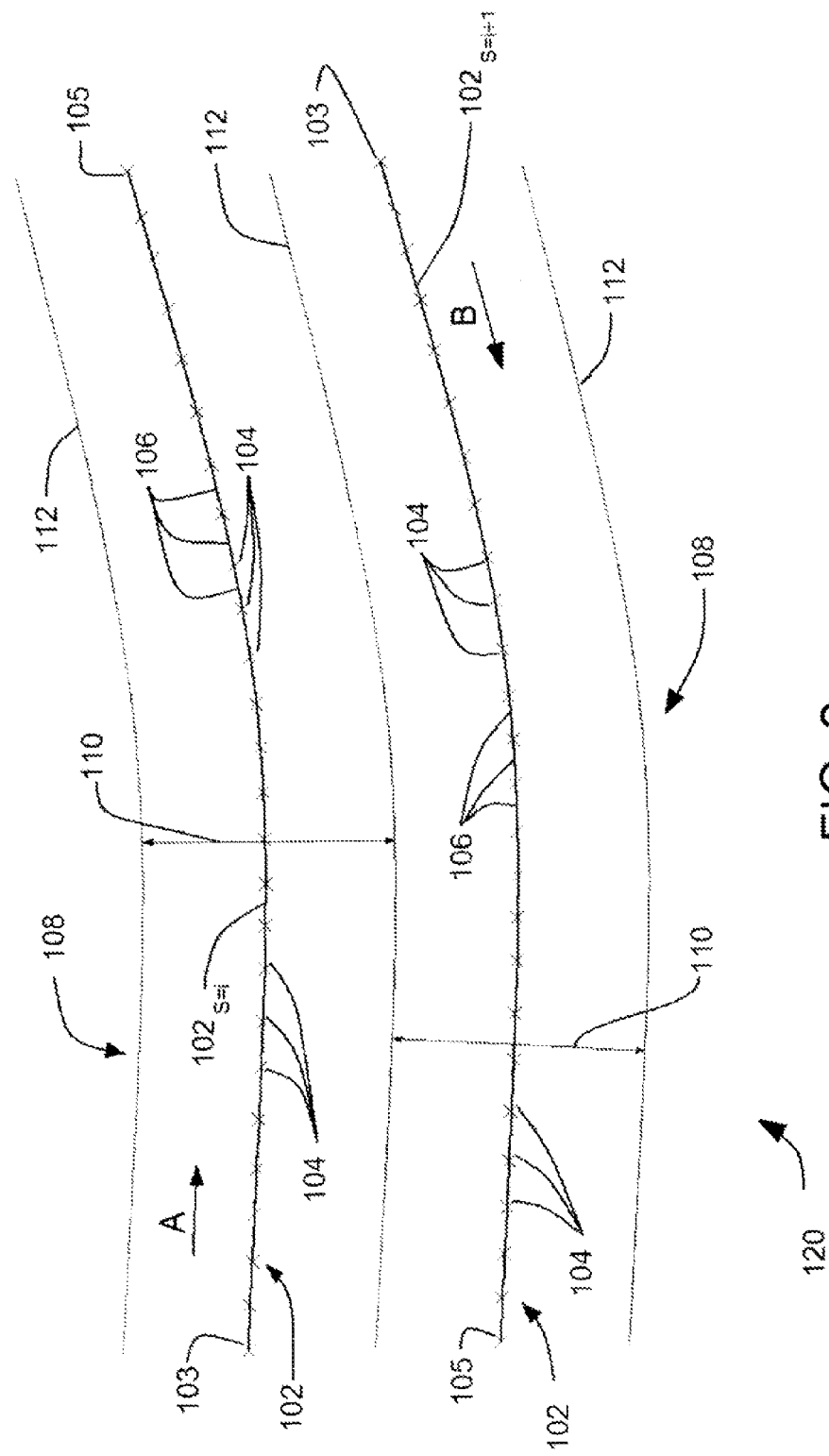
FIG. 2 illustrates a portion of a pair of swath paths and an embodiment of nomenclature that may be used in curved swath path generation.
Figure 3A:
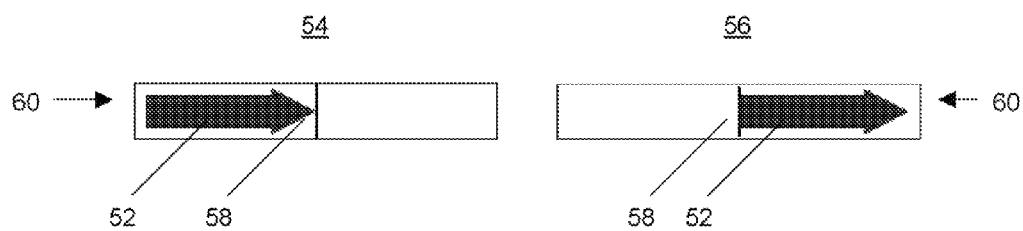
FIGS. 3A-3D illustrate the swath finder indicator of the present invention.
Figure 3B:
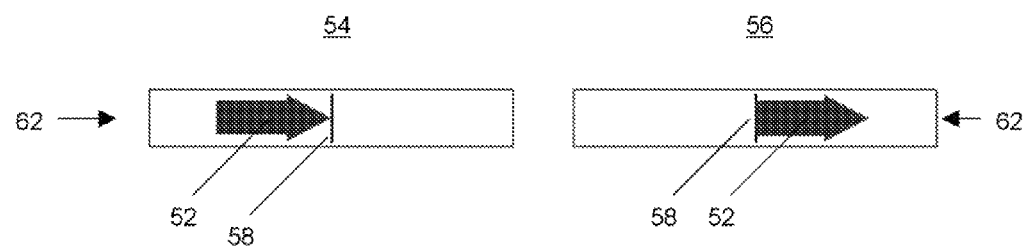
Figure 3C:
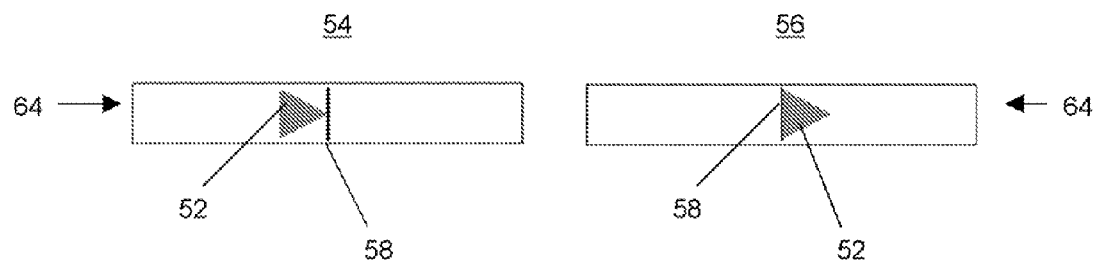
Figure 3D:
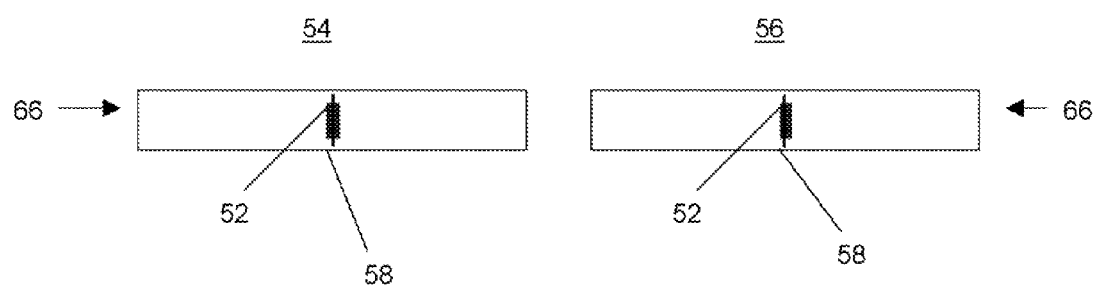

Referring now to FIG. 2, there is shown a portion of a typical curved swath arrangement in a field. A swath 108 is created when an implement having an effective working (swath) width 110 traverses a swath path 102 over the ground. The implement may be a single-use self-propelled unit, or may be pushed, towed, or otherwise connected to a prime mover traversing the swath path 102. Swaths 108 are defined by a plurality of position data points 104 spanning from a beginning position 103 to an end position 105. Swath segments 106 connect adjacent pairs of position data points 104 along each swath path 102. A swath pattern 120 is comprised of one or more swaths arranged so that substantially all of the tillable area of a field is covered by the swaths 108, shown as swath paths $102_{S=i}$ and $102_{S=i+1}$. In an agricultural application, a farmer typically processes a field in long swath paths, turning at the end of a first swath path after having traversed the swath, and returning to the starting end of the field along a second swath path that may be adjacent to the first swath path depending upon the swath pattern used. If the farmer processes the field topographically (contour plowing), a curved path typically defines each swath path. As they move through the field, the tractor and the implement will create a distinct swath pattern through the field. The SGA 10 calculates at least one swath pattern that covers as much of the crop planting area of the field as is practical while minimizing the portions of the area that are covered multiple times.

Typical GPS SGA systems use an indicator with LED lights arranged in rows and often with different colors to indicate different elements. The LEDs are arranged in a line, with the center LED being a different color or size from the rest. The center LED serves to indicate the correct predetermined swath path that the SGA has determined the vehicle should be following. The line of LEDs is often referred to as light bars. As the vehicle deviates from the predetermined swath path, the LEDs to the left or right are illuminated, depending on the direction the operator must steer to make a correction, to indicate to the operator that a correction must be made to maintain the vehicle on the predetermined path. The systems utilizing the light bar indicators can operate in both the chase and pull modes of operation, but give no indication to the operator of which mode is currently active, or which direction the operator must steer to correct the vehicle swath path. The present invention eliminates the light bar display and provides a method for indicating a correction in the direction of the vehicle should the vehicle deviate from the predetermined swath path.

As shown in FIGS. 3A-3D, the present invention provides a method for display with a continuous indication of direction and distance when the vehicle does not stay on the predetermined swath path generated by the control system. The continuous display 60 indicates the distance and direction the vehicle has moved off course from the predetermined path. The continuous display 60 replaces and simulates LED light bars, and assists the operator in steering to the nearest predetermined swath. The appearance of the arrow 52 on the continuous display 60 is dependent upon the operation setting, either the "chase" 54 or the "pull" 56 mode of operation. The continuous display 60 determines and displays which direction the operator must steer to correlate the vehicle's path based on a stored ideal or predetermined path, the position of the vehicle, operator selectable parameters and other vehicle parameters. The stored or predetermined path can be a path that the operator has stored in the system previously, or can be a newly stored path that is newly generated for this particular application. For example, the operator may be located in the same field that was used previously, and the same swaths paths are to be followed. The operator may choose to use the stored swath path used previously. In addition, the operator may choose to create a new swath path pattern. Either way, the user must initiate a desired swath path so a predetermined or stored path may be used as the basis swath path for the display 60. The position of the vehicle is determined by the GPS stored in the system. The display software continuously monitors the position of the vehicle in the field and compares it to the predetermined swath path to determined if a correlation must be made by the user to maintain the vehicle on the desired predetermined path. The operator selectable parameters may include, but are not limited to the mode of operation, i.e. the chase 54 or pull 56 mode, and either automatic or manual mode of operation. Lastly, vehicle parameters may include, but are not limited to, implement type and size, and vehicle capabilities such as speed and size.

The system may be set to either the chase 54 or the pull 56 mode of operation and displays the mode of operation clearly for the user so there is no confusion as to what mode 54, 56 the display is showing. The chase mode 54 exists when the pointer of the arrow 52 indicates that the operator must steer the distance shown, in the direction of the arrow, in order to reach the desired swath path. The center bar 58 indicates the final destination the operation must travel to in order to reach the predetermined swath path 102. The end opposite of the point of the arrow 52 indicates where the vehicle is located in relation to the predetermined swath path. It should be understood that while an arrow 52 is shown as the indicator on the display 60, any type or shape of indicator could be used for the display 60 in the present invention. The length of the arrow 52 indicates the amount of change the vehicle must make before lining up with the predetermined swath path and the direction of the pointer on the arrow indicates the actual direction that the operator must steer. As specifically shown in FIGS. 3A and 3B, if the arrow is long, e.g. ¼ or more of the total display width, a large change and a longer distance of travel is indicated. In that case, the arrow 52 will appear dark red as shown in the indicators 60, 62. As specifically shown in FIG. 3C, if the arrow is shorter, e.g. less than ¼ or more of the total display width, a smaller change and a shorter distance to travel to meet the predetermined swath path is indicated. In that case, the arrow 52 will be a dark yellow or orange color, as shown in the indicators 64. As specifically shown in FIG. 3D, if no correlation is necessary and the vehicle is on the predetermined swath path, only a dark green bar 66 will appear on the center bar 58. It should be understood that the difference in color is important, however, the exact colors provided in this specification are only examples and are not necessary for the present invention. Any combination of different colors may be used to indicate the amount of change necessary on the display 60.

The pull mode 56 exists when the arrow 52 indicates that the used must steer the indicated distance in order to reach the desired swath path. The center bar 58 indicates where the vehicle is located in relation to the predetermined swath path. The other end of the arrow 52 indicates where the vehicle is located in relation to the predetermined swath path.

In addition to displaying the direction necessary for the user to navigate the vehicle, the arrow 52 also allows the distance for correlation to be accurately and exactly indicated. The continuous display arrow 52 displays the actual distance in a scaled method. For example, the present invention allows the display to show one and a half feet, one-eighth feet, three and two-tenths feet, and so on (not shown in figures). It should be understood that the increments of distance provided are for example purposes only and may include metric or other scales and are not intended to limit the specification to these increments in any way. The display may be configured to display a maximum or minimum distance, dependant upon the operator's preference. In addition, the display may also provide a digital readout of the actual deviated distance.

In addition to the present invention providing the operator with a continuous display for correlating the vehicle on a predetermined swath path 102, the present invention also provides a guidance system for aiding the operator with lining up the vehicle to the next swath path as the vehicle makes end of row turns. Typically, automatic guidance systems do not make turns at end of the field rows, and the operator must manually line the vehicle up to the next swath path without any GSP or display assistance. The present invention provides a method for assisting the operator in properly lining up the vehicle prior to resuming the automatic mode of operation. In addition, the method indicates which direction the vehicle will turn and how far the vehicle will steer, for safety purposes, and prevents the operator from accidentally engaging the wrong swath and being surprised by the direction and degree the vehicle turns. To ensure that the system is able to provide this information to the user, all of the parameters are utilized, including the stored ideal or predetermined path, the position of the vehicle, operator selectable parameters and other vehicle parameters The user may input minimum and maximum ranges for the distances between the vehicle and the swath being tracked. The user may input minimum and maximum ranges for swath finders, swath ranges, swath mode, and the swath time. In addition, the display 50 may be used for both automatic and manual modes of operation. It may also be used for manual guidance only, or when the vehicle is operated in a combination of both the manual and automatic modes. Different mathematic algorithms can be used depending on the mode of operation. When in the manual mode of operation, the algorithm accounts for a projected user reaction time. The algorithm produces an indicator for the display 60 that allows the user to have a normal reaction time to correlate the vehicle's path to return or maintain on the predetermined desired swath path. The indicator is not displayed proportionally to the actual real time error, in order to allow for reaction time of the operator. The algorithm projects the error in anticipation of the vehicle's path assuming the vehicle continued to travel in the same direction. As the operator corrects the vehicle's path, the indicator arrow 52 continually changes in length and color to indicate that the path is corrected (or made worse) by the user's actions. In the automatic mode of operation, an algorithm is used that does not account for user reaction time, because the vehicle is automatically directing itself without the aid of an operator. Therefore, instant modifications and correlations may be made to correct the vehicle's path to maintain a course in line with the predetermined swath path. The display continues to indicate the vehicle's path and the vehicle's path error, however the path is displayed without an allowance for reaction time.

Figure 4:
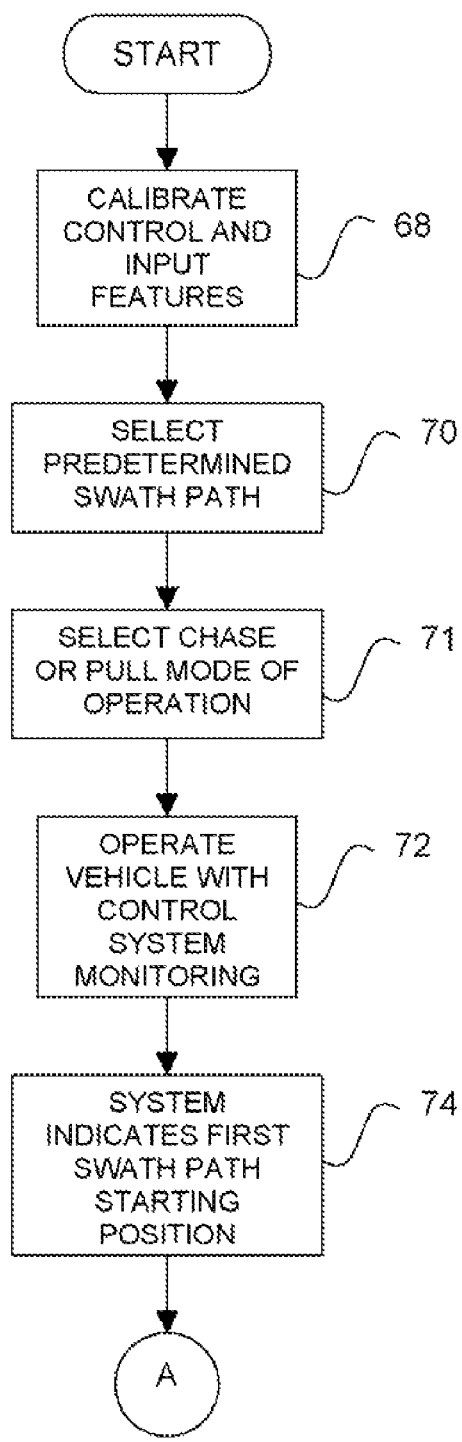
FIG. 4 illustrates a flow chart of the method of the present invention.

FIG. 4 illustrates a flow chart of operation of the method of the present invention. The user must calibrate the control to identify the vehicle type and other vehicle parameters in step 68. These multiple features may include, but are not limited to the swath finder time, the aggressiveness setting and the minimum turning radius, antenna height, axle distance, and nudge/trim definition. The swath finder time allows the operator to control the reaction time allowed for the operator when in the automatic mode of operation. The aggressiveness setting controls how quickly the vehicle steers during automatic operation to keep the vehicle in line with the predetermined swath path. The minimum turning radius feature is used when generating curved swaths for the vehicle with implements attached. The method allows the user to input the antenna height and axle distance based on the vehicle model used, and the nudge/trim definition allows the operator to control the amount of nudge or trim of the vehicle. In addition, the features may also include calibrating the vehicle by setting the implement width, the desired swath width, the implement offset, and inputting the maximum steering angle depending upon the implement used. Next, in step 70, the operator either selects or inputs the predetermined or desired swath path the control system is to use and in step 71, the operator indicates whether the system will be operating in the chase or pull mode of operation. This swath path may be stored in the system, or the operator may set a new path before initializing the control system. In step 72, the operator begins to operate the vehicle with the control system. The control system indicates where the operator must guide the vehicle in order to initiate the first swath path on the predetermined swath pattern regardless of whether the operator chooses to operate in the automatic or manual mode of operation in step 74.

Figure 5:
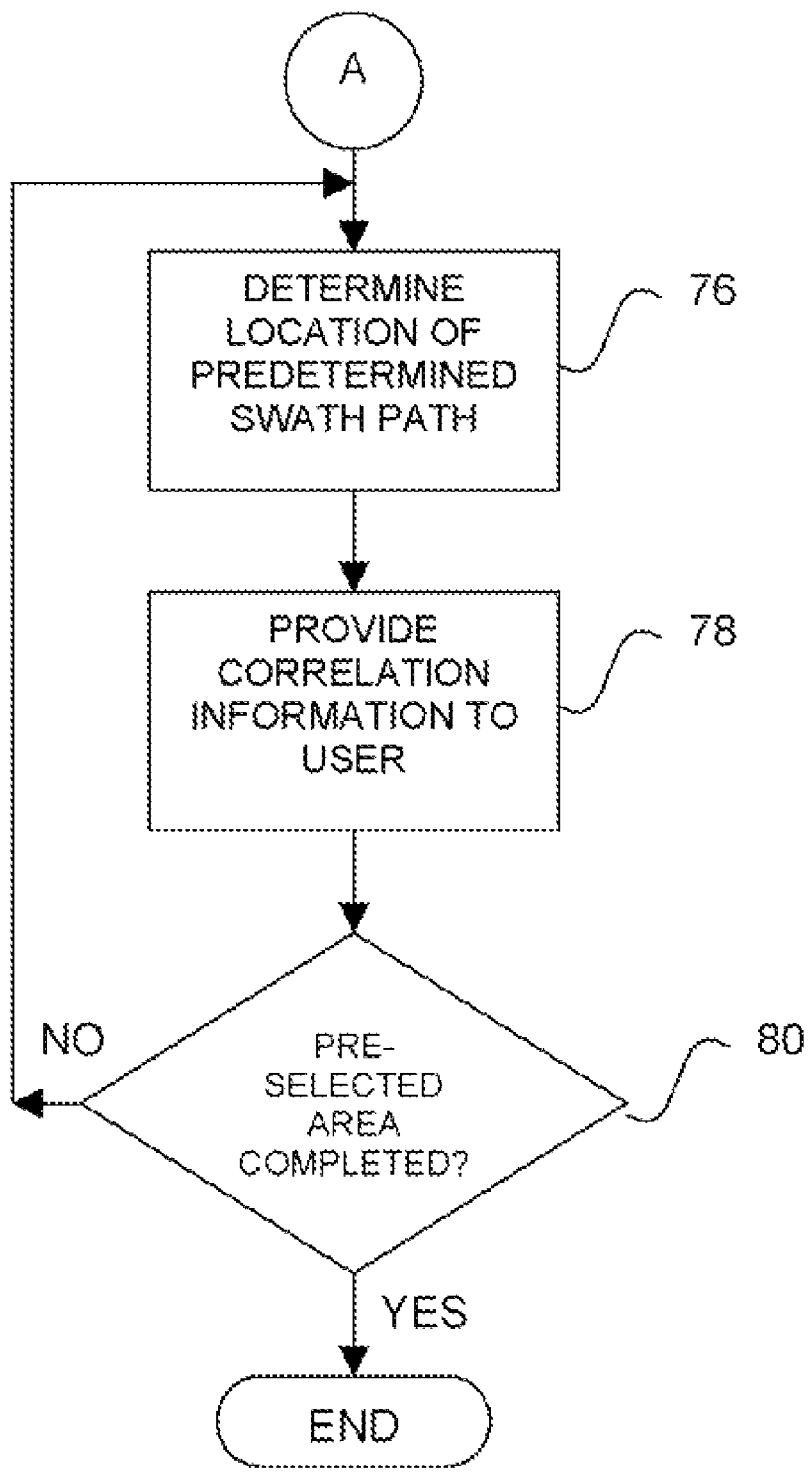
FIG. 5 illustrates a flow chart of the method of the present invention.

FIG. 5 illustrates the method of the present invention as the vehicle is operating. As the operator approaches the first end of row turn, the control system calculates the next swath path and indicates on the integrated display where the operator must steer in order to line up the vehicle correctly with the predetermined path in step 76. The control system uses all of the features inputted by the user in step 68 (FIG. 4) to determine the vehicle's turn radius and speed. In step 78, the control system monitors the vehicle's path and continually provides information to the user based on the direction of correlation, if necessary, for the user to guide the vehicle onto the path of the predetermined swath. The algorithm used in the manual mode of operation take into account an operator reaction time. The reaction time is variably selected by an input the operator selects in step 68 (FIG. 4). The operator may choose a longer reaction time, or a shorter reaction time, depending upon the operator's preference. The control system uses the chosen reaction time and produces a result based on the manual mode algorithm, which determines how the operator must direct the vehicle to correlate the actual path of the vehicle with the predetermined swath path 102.

The algorithm used for the automatic mode of operation does not allow for user reaction time. When the vehicle is operating in automatic mode, there is no human reaction time to account for, thus an algorithm is used which displays the correlation necessary without factoring in a projected reaction time. In addition, the automatic mode algorithm does not allow for user reaction time because in the event the vehicle is traveling on a turn, allowance for a user reaction time, as used in the manual mode algorithm, would result in an error. Instead, the control system determines how much correlation is necessary between the actual path of the vehicle and the predetermined swath path 102 and displays the distance and direction on the integrated display. The vehicle reacts to the correlation output and corrects the vehicle's path to be in line with the predetermined swath path. The control system also operates such that if the user alternates between the automatic and manual modes of operation, the appropriate algorithms are used to provide for reaction time in manual mode and for no reaction time in automatic mode of operation. Next, the control system checks if the pre-selected area is completed in step 80. If the pre-selected area is not complete, the user then repeats steps 76, 78 and 80.

In addition to providing the swath finder feature for the chase and pull modes and for manual or automatic mode of operation, the present invention provides an integrated display that includes the continuous indicator display (FIG. 3) as well as displays for multiple monitoring and user interface functions. These functions may include, but are not limited to speed monitors, fault indicators, work progress tracking (such as acres and area harvested) and implement control. A single LCD display may be used where the user need only to purchase one display that will be used for all of the previously mentioned functions, as well as any other functions necessary. With this single display method, the user only has one area of interest to direct their attention as compared to several active displays, all controlling the operator of the vehicle. The placement of the swath finder window is user configurable. For example, the user may place the swath finder window above or below a map on the display. With one concentrated and integrated display, the user only need look in one location to receive the same information that was once displayed across several different displays. The display device used for the present invention may be, but is not limited to, a touch screen LCD display that is easily readable in all conditions, such as daylight and dusk for example.

The display or user interface has one or more runs screens that are user definable, where the user has multiple screens to interface with and toggle between depending on the operating conditions of the vehicle. For example, the display is capable of showing a diverse amount of information, but may not be capable of displaying all of this information on the display at one time. The information is then categorized into various user defined 'screens', where the display shows one screen at a time, on a rolling basis, so that the user may toggle between the various screens to view all of the information as desired. The screens may also automatically toggle, so that the user only has to watch the display as the screens toggle from one screen to another, eventually displaying all of the information for the user. The swath finder window can only appear once on a particular run screen, or only one swath finder can appear at a time. In addition, the swath finder window is not linked to any other information shown on the display, and the user may determine the size of the swath finder window displayed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for a vehicle navigation system comprising the steps of:
   providing a vehicle having a plurality of modes of operation with an associated implement;
   providing a vehicle navigation system having a vehicle position receiver;
   providing a swath path generation apparatus (SGA) having a processing capability and an SGA memory device, the SGA being communicatively coupled to the navigation system;
   providing an operator input device;
   communicating a set of predetermined parameters to the SGA;
   providing a calculated swath path adjacent to and generally parallel to a baseline swath path;
   monitoring an actual swath path of the vehicle;
   comparing the actual swath path of the vehicle to the calculated swath path;
   calculating, by an iterative process, a corrected swath path to maintain the vehicle's operation along the calculated swath path, the corrected swath path based on the set of predetermined parameters stored in the SGA memory device, the vehicle's actual swath path and the calculated swath path;
   providing a display unit configured to display information from the corrected swath path, the information being configured to indicate direction and distance of correction required for the vehicle to travel from the actual swath path to the calculated swath path if either a chase or pull mode of operation is selected; and wherein the method is configured for at least chase and pull modes of operation.

2. The method of claim 1 wherein the method further includes the step of providing a user selectable option to choose between a plurality of modes of operation.

3. The method of claim 2 wherein the step of providing a display unit configured to display information further includes the display unit being configured to function for each mode of the plurality of modes of operation, and wherein the plurality of modes of operation include at least pull and chase modes of operation, the display unit further having a reference point and at least one visible indicator representing the distance and direction between the actual swath and the calculated swath in both the pull mode and the chase mode, wherein in the chase mode the calculated swath is located in the direction of the indicator with respect to the reference position, and in the pull mode the swath path is located in the direction of the reference point with respect to the indicator.

4. The method of claim 2 wherein the step of providing a display unit configured to display information further includes the at least one direction and distance indicators are continuous and configured to be displayed when chase mode or pull mode is active.

5. The method of claim 3 wherein a manual mode of operation is selected and an algorithm is used to provide a human reaction time; and
   the display indicates the accurate direction and distance of correction required for the vehicle to travel from the actual swath path to the calculated swath path with a human reaction time allowance.

6. The method of claim 3 wherein the indicator is displayed differently when showing the accurate direction and distance of correction required for the vehicle to travel from the actual swath path to the calculated swath path dependent upon whether the vehicle is in the chase or pull mode.

7. The method of claim 3 wherein displaying the continuous indicators include varying at least one of the color and length of the indicators depending upon the amount of correlation necessary to correlate the vehicle's actual path with the predetermined swath path.

8. The method of claim 6 wherein the step of providing a display unit further comprises displaying at least one of the mode of operation of the vehicle, the work area completed, the total work area and the predetermined parameters.

9. The method of claim 1 wherein the step of providing a display unit configured to display information from, the corrected swath path further comprises providing a user selectable option for the display placement in relation to a plurality of other display windows and providing a user selectable option for choosing the display size.

10. A method for a vehicle navigation system comprising the steps of:
    providing a vehicle with an associated implement, the vehicle being configured to operate in a chase mode of operation and a pull mode of operation;
    operating the vehicle in a manual mode of operation;
    providing a vehicle navigation-system having a vehicle position receiver;
    providing a swath path generation apparatus (SGA) having a processing capability and an SGA memory device, the SGA being communicatively coupled to the navigation system;
    providing an operator input device;
    communicating a set of predetermined parameters to the SGA;
    providing a calculated swath path adjacent to and generally parallel to a baseline swath path;
    monitoring an actual swath path of the vehicle;
    comparing the actual swath path of the vehicle to the calculated swath path;
    calculating, by an iterative process, a corrected swath path to maintain the vehicle's operation along the calculated swath path, the corrected swath path based on the set of predetermined parameters stored in the SGA memory device, the vehicle's actual swath path and the calculated swath path; and providing a display unit configured to display information from the corrected swath path, the information being configured to indicate direction and distance to the calculated swath path in both the chase and pull modes.

11. The method of claim 10 wherein the method further includes the step of:

providing a user selectable option to choose between the chase mode of operation and the pull mode of operation.

12. The method of claim 10 wherein the step of providing a display unit configured to display information further includes the display unit being configured to function for both the chase mode of operation and the pull mode of operation, the display unit further having a reference point and at least one visible indicator representing the distance and direction between the actual swath and the calculated swath, wherein in chase mode the calculated swath is located in the direction of the indicator with respect to the reference position, and in pull mode the swath path is located in the direction of the reference point with respect to the indicator.

13. The method of claim 12 wherein the step of providing a display unit configured to display information further includes the display being configured to indicate the accurate direction and distance of correction required for the vehicle to travel from the actual swath path to the calculated swath path regardless of the mode of operation by displaying continuous directional indicators and continuous distance indicators.

14. The method of claim 13 wherein
an algorithm is used to provide a human reaction time; and
the display indicates the accurate direction and distance of correction required for the vehicle to travel from the actual swath path to the calculated swath path with a human reaction time allowance.

15. The method of claim 12 wherein the at least one indicator is continuous and varying at least one of the color and length of the indicators depending upon the amount of correlation necessary to correlate the vehicle's actual path with the calculated swath path.

16. The method of claim 10 wherein the step of providing a display unit further comprises displaying at least one of the mode of operation of the vehicle, the work area completed, the total work area and the predetermined parameters.

17. The method of claim 10 wherein the step of providing a display unit configured to display information from the corrected swath path further comprises providing a user selectable option for the display placement in relation to a plurality of other display windows and providing a user selectable option for choosing the display size.

18. The method of claim 13 wherein the step of providing a display unit further comprises displaying the indicator both differently and in a different position with respect to the reference point if the display unit is in chase mode or pull mode.

19. A vehicle navigation system comprising:
a vehicle and an implement associated with the vehicle;
a vehicle navigation system having a vehicle position receiver being configured to monitor an actual swath path associated with the vehicle;
an operator input device;
a swath path generation apparatus (SGA) having a processing capability and an SGA memory device, the SGA being communicatively coupled to the vehicle navigation system and the operator input device, being configured to store a set of predetermined parameters and calculate, by applying a first algorithm, at least one calculated swath path arranged generally parallel to the baseline swath path, and being configured to calculate a corrected swath path by applying a second algorithm, the corrected swath path based on the set of predetermined parameters stored in the SGA memory device, the actual swath path of the vehicle and the calculated swath path;
a display unit configured to display at least one of a baseline swath path, the actual swath path and at least one calculated swath path, being adjacent to the baseline swath path and display information from the corrected swath path, the display unit having a reference position and at least one visible icon, wherein in a chase mode the calculated swath is located in the direction of the icon with respect to the reference, and in a pull mode the swath path is located in the direction of the reference point with respect to the icon, the icon being configured to indicate steering direction and distance between the actual swath path and the calculated swath path in both the chase and pull modes; and
wherein the vehicle navigation system correlates the corrected swath path with the actual swath path to maintain the actual path of the vehicle in alignment with the calculated swath path.

20. The system of claim 19 wherein the baseline swath path is a stored swath path from the control system's memory.

21. The system of claim 19 wherein the predetermined parameters include at least one of a vehicle type, a vehicle model, a vehicle minimum turning radius, an associated implement, an antenna height, a distance from the implement to the axle, and a vehicle aggressiveness value.

22. The system of claim 19 wherein the at least one icon is displayed continuously and varies at least one of the color and length of the indicators depending upon the amount of correlation necessary to correlate the vehicle's actual path with the calculated swath path.

23. The system of claim 19 wherein when the vehicle is operating in the manual mode of operation, the second algorithm has a factor for a human reaction time.

24. The system of claim 19 wherein the user determines the placement of the display unit in relation to a plurality of other display windows and chooses the display unit size.

* * * * *